UNITED STATES PATENT OFFICE 2,661,332

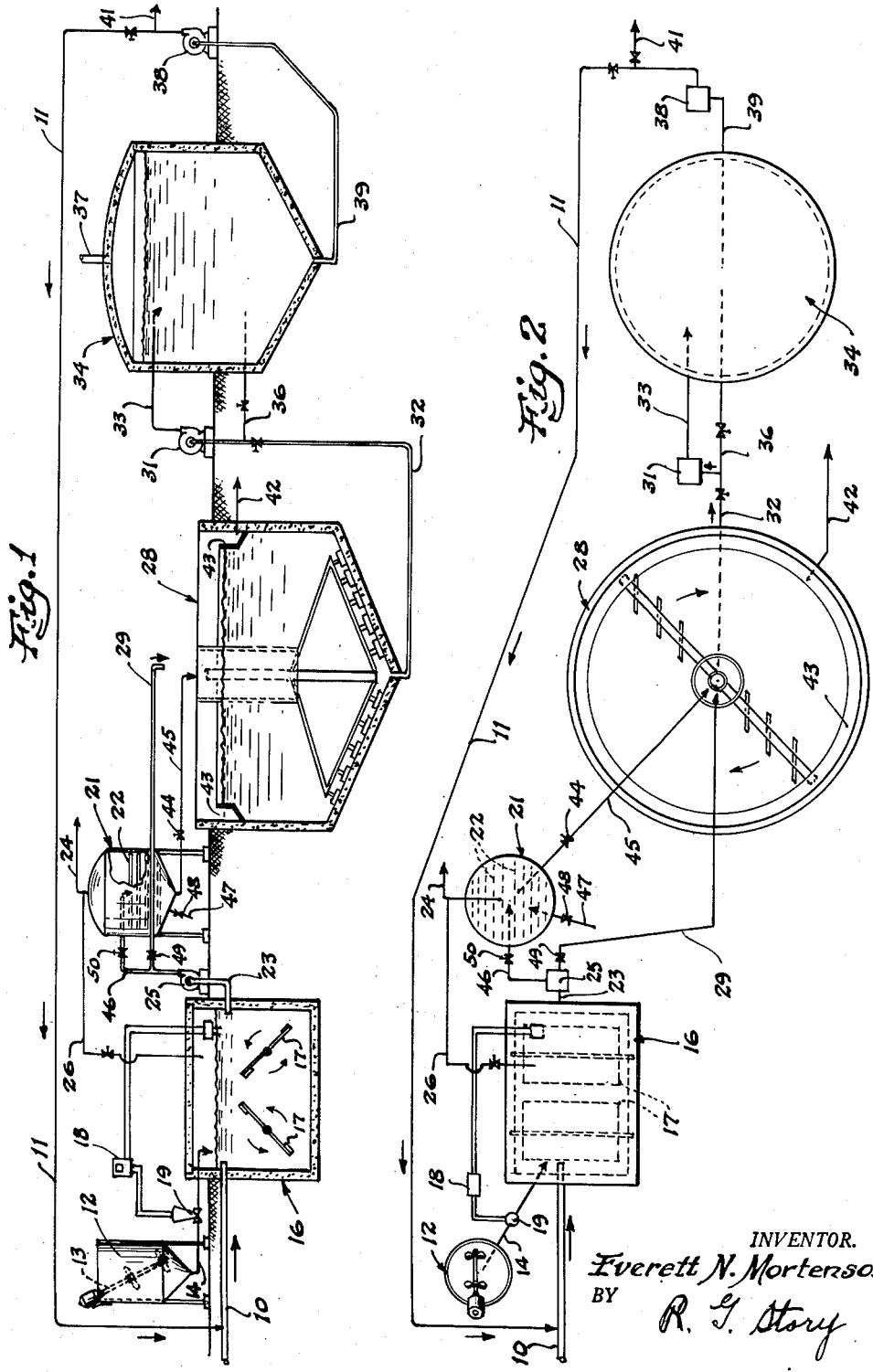

SEWAGE TREATMENT

Everett N. Mortenson, Chicago, Ill., assignor to Swift & Company, Chicago, Ill., a corporation of Illinois Application September 29, 1949, Serial No. 118,510

6 Claims. (Cl. 210—2)

This invention relates to sewage treatment and, more particularly, to a process for treating raw wastes, such as raw sewage or fresh industrial wastes, in which anaerobic sludge is admixed with the raw waste prior to settling the waste in order to produce a more concentrated sludge suitable for anaerobic digestion and a supernatant liquid substantially free of suspended solids and low in soluble organic material content.

The present process is particularly adaptable to sewage or strong industrial wastes, such as those from canneries, milk processing plants, meat packing plants, etc., which have a relatively large solids content. A variety of processes has been employed or proposed for treating such wastes. Nearly all of them involve a digestive treatment of sludge with anaerobic bacteria in some stage of the process either in a septic tank, an Imhoff tank, or one or more separate digesters. In large-scale operations, at least one separate digester is usually employed and the digestive treatment may be combined with various other sewage treatment steps, such as activated sludge or trickling filter operations. In the digesters in any of these processes, the sludge is treated by being subjected to the action of anaerobic bacteria to decompose a large percentage of the suspended solid material into gaseous compounds. The present invention is concerned with processes in which the raw sludge is delivered directly into a digester after a preliminary settling operation on the raw waste and involves the discovery that mixing with the incoming raw waste a relatively large amount of a stable and active anaerobic sludge withdrawn from a digester causes a flocculation of the suspended solids in the raw waste, resulting in rapid settling of said solids and producing a more concentrated raw sludge and a clear supernatant liquid which in many cases may be discharged as treated sewage or which may be subjected to further treatment to reduce its biological oxygen demand. In addition to flocculation and separation of suspended solid matter, a substantial amount of soluble organic matter in the raw waste is removed from the discharged supernatant liquor in the settling operation by the anaerobic sludge added to the raw waste and settled therefrom. This removal of solubles is not caused by digestive action in the mixing and settling steps but represents a bioflocculation and adsorption of the soluble substances into the active anaerobic sludge. The flocculation of suspended solids, as well as the removal of soluble organic matter, occurs most efficiently within a distinct pH range, and lime or other suitable pH adjusting agents may be added to the mixture of raw waste and anaerobic sludge.

After the anaerobic sludge has been mixed with the raw waste with slow agitation for a short period of time and the pH adjusted, if necessary, the mixture is allowed to settle for a short period of time and the settled mixture of raw sludge and anaerobic sludge delivered into a digester. The total amount of material passing through the digester in accordance with the present invention is much less than that of previous processes since the flocculation and separation steps above discussed effectively reduce the water content of the sludge entering the digester.

The process briefly described above should be carefully distinguished from processes in which anaerobic sludge from a digester is admixed with raw sludge previously settled from raw waste in order to inoculate the raw sludge with anaerobic bacteria. Such processes usually involve a series of digesters in which sludge from a subsequent digester in the series is recycled back to the first digester. Such processes do not employ anaerobic sludge as a flocculating and adsorbing agent to assist in recovering a concentrated raw sludge from raw waste in a settling operation prior to digestion since the initial settling operation is conducted in the absence of anaerobic sludge. The present process should also be carefully distinguished from suggested processes in which raw waste prior to settling is delivered directly into the first of a series of digesters and anaerobic sludge from a subsequent digester of a series of digesters is returned to the first digester in order to inoculate the raw waste being introduced into the process. In such processes, the entire unsettled raw waste is delivered into the first digester. The present process should also be carefully distinguished from processes involving the return of activated, i. e., aerobic, sludge from a settling tank to an aeration tank receiving raw sludge from a preliminary settling operation on raw waste in an activated sludge process in order to inoculate the previously settled raw sludge. The introduction or recycling of anaerobic sludge into a flocculation and separation operation in accordance with the present invention is also entirely distinct from returning supernatant liquor from a digester to a preliminary settling tank for raw waste such as occurs in most trickling filter or activated sludge operations. The supernatant liquid from a digester carries very little anaerobic bacteria and is not an effective flocculating or adsorbing agent for assisting in recovering a concentrated raw sludge from raw waste. In the trickling filter or activated sludge operations, the return of supernatant liquid from a digester to a preliminary settling operation on the raw waste is merely a convenient method of insuring that such supernatant liquid is given an oxidizing treatment before being discharged from the process.

The preferred steps of the present invention involve the withdrawal of stable and active anaerobic sludge from a properly operating digester and mixing this sludge with raw waste in an agitator or other similar mixing device. In general, the raw wastes are acidic and in most cases it is desirable to add lime to the mixture of raw waste and anaerobic sludge in order to bring the mixture to a neutral or slightly alkaline condition. The resulting mixture is then preferably slowly agitated in a flocculating tank after which it is delivered to a settling tank. It has been found that the anaerobic sludge has an effective flocculating action upon the suspended solids in the raw waste to cause small particles of such solids to agglomerate into larger particles which readily settle from the supernatant liquid to produce a relatively high solid content sludge and a supernatant liquid substantially free of even very small suspended solids. The anaerobic sludge also removes a substantial amount of soluble organic material by adsorption or precipitating to further reduce the organic material in the supernatant liquid. The settling action of the flocculated material may, in most cases, be somewhat enhanced by providing a degasification step between the flocculation step and the settling step. Such a step may comprise passing the material from the flocculating step through a degasification tower in which the material is subjected to a vacuum with or without the passage of air upwardly through the tower. Alternatively, degasification of the anaerobic sludge prior to admixing such sludge with the incoming raw waste may be employed. Either type of degasification step is particularly advantageous when strong odors from the settling tank cannot be tolerated and the settling tank is open to the atmosphere, but is usually unnecessary where odors are not a problem.

As stated above, the flocculated mixture of raw sludge and recycled anaerobic sludge from the digester settles rapidly and cleanly in the settling tank due to the flocculating action of the anaerobic sludge so that a clear supernatant liquid having a very much reduced content of organic material can be withdrawn from the settling tank. The settled sludge which is much more concentrated than it is possible to obtain by merely settling raw waste, is delivered into a closed digester of any suitable type and subjected to agitation under anaerobic conditions. Such sludge has already been inoculated with anaerobic bacteria by admixture of digester sludge with the raw waste prior to the flocculation and separation steps. In the digester a large portion of the insoluble organic compounds is converted into gaseous compounds which may be disposed of in any known or suitable manner. The resulting anaerobic digester sludge is withdrawn from the digester and a substantial portion, usually a major portion, of this sludge delivered to drying beds in accordance with the usual treatment of digester sludge, while another portion of this sludge, ranging from 10% to 50%, is returned to the process by admixing the same with the entering raw waste.

It is therefore an object of the present invention to provide an improved process of treating sewage or industrial wastes in which the suspended solids in such wastes are flocculated prior to settling by employing anaerobic digester sludge as a flocculating agent.

Another object of the invention is to provide an improved process of treating sewage in which the flocculating action of anaerobic digester sludge upon the suspended solids in raw waste, as well as the adsorbing and precipitating action of such sludge upon soluble organic material, is employed to produce a concentrated sludge for delivery into a digester and to produce a supernatant liquid substantially free of suspended solids and having a low content of soluble organic material.

Also an object of the invention is to provide an improved process of treating raw sewage or industrial wastes in which the suspended solids in such wastes are flocculated by employing anaerobic digester sludge, particularly returned anaerobic digester sludge, as a flocculating agent, and by employing lime or other alkali to maintain the pH of the mixture at an optimum.

A further object of the invention is to provide an improved process of treating raw sewage or industrial wastes in which a concentrated sludge is first produced by flocculation and settling of suspended solids in the raw waste so as to enable a digester of smaller size than is usually required for anaerobic treatment of the same amount of raw sludge to be employed.

Other objects and advantages of the invention will appear in the following description of a preferred embodiment thereof, suitable apparatus for carrying out the process being indicated in the attached drawing which is a schematic flow diagram of a sewage treating apparatus in accordance with the present invention.

Figure 1 represents a schematic plan view of an installation for carrying out the method of the present invention.

Figure 2 is a top view of the installation shown in Figure 1.

Referring to the drawing, raw or fresh sewage, including strong industrial wastes, may be introduced into the process through a line indicated at 10. Aanaerobic sludge from a digester, described below, may enter the line 10 from a line 11, and lime slurry of slaked lime $(Ca(OH)_2)$, or other suitable alkaline material, from a slurry tank 12 provided with an agitator 13 may also be introduced into the line 10 or into tank 16 from line 14. The mixture of raw wastes, anaerobic sludge, and lime may be delivered into a flocculating tank 16 wherein it is subjected to relatively slow agitation, for example, by agitators 17. The agitation tank in the flocculator 16 should be merely sufficient to thoroughly admix the various materials. For example, the peripheral speed of the agitating blades of the agitator 17 may be in the neighborhood of one-half to two feet per second.

Depending upon the nature of the waste being treated, the time of agitation in the flocculator tank will usually range between one-half and six hours. The flocculating tank is preferably a closed tank, and it may be maintained under vacuum conditions if degasifying of the sludge mixture is desired. The amount of lime added to the materials entering the flocculator may be automatically regulated in order to provide a suitable pH in the flocculating tank, for example, by a pH meter and a controller indicated at 18 actuating a control valve 19 in the line 14 from the slurry tank 12. The pH found most suitable for producing rapid flocculation and settling, as well as optimum removal of soluble organic material, is within the range of 7 to 9.5, and this pH range also provides for rapid digestion in the digester.

A degasifier is shown at 21 and may be in the form of a tower having a plurality of baffles 22. The flocculated mixture from the flocculator 16 may be delivered into the degasifier 21 through lines 23 and 46 by means of pump 25 so as to pass downwardly over the baffles 22. The top of the degasifier may be connected to a vacuum system (not shown) through a gas line 24 to which a gas vent 26 from the flocculator may also be connected. It is preferred to operate the vacuum system to produce a partial vacuum in the degasifier 21, for example, a vacuum of at least about 10 inches of mercury, and to pass air upwardly through the degasifier, for example, at a rate ranging between 0.05 and 0.2 cubic feet of air per gallon of sewage treated, the air being introduced through a suitable line 47 controlled by valve 48 at the lower end of the degasifier. The degasifier is optional equipment, and it may be by-passed wholly or in part, as desired, by closing valve 50 in line 46 and opening valve 49 and passing the waste directly to a settler 28 through line 29.

The degasified mixture may be delivered into a settling tank 28 through a line 45, controlled by valve 44, constituting a barometric head to maintain the vacuum in the degasifier 21. As stated above, the degasifier is optional in the present process and will usually be employed only when it is necessary or desirable to partially deodorize the material leaving the flocculator and entering the settling tank. Removal of gases does, however, assist in the settling action in the tank 28, but adequate settling can ordinarily be obtained without the degasifying step.

The flocculated sludge settles rapidly in the settling tank 28, substantially complete settling usually being obtained in 1 or 2 hours. The settled sludge may be withdrawn from the lower portion of the settling tank 28 by means of a pump 31 through a line 32 and delivered through a line 33 into a digester 34. Sludge withdrawn from the settling tank 28 will usually have a solids content of between 3% and 6% as compared with sludge obtained from the usual preliminary settling operations on raw sewage or industrial wastes in which the solids content ranges from 1 to 2%. The supernatant liquid separated from the settled sludge also has a lower content of soluble and suspended organic material than that from the usual preliminary settling operations, although very little digestive action takes place in either the flocculator or settling tank and substantially all the digestion in the process occurs in the digester 34.

Digestion in the digester 34 in which the sludge is maintained out of contact with the atmosphere, however, proceeds rapidly due to the thorough inoculation of sludge with anaerobic bacteria. Substantially complete digestion is usually obtained in periods ranging from 12 to 120 hours, depending upon the type of waste or sewage being treated. The pump 31 may be employed to admix the sludge undergoing digestion in the digester 34. For example, sludge may be continuously withdrawn from the digester 34 through a line 36 by the pump 31 and returned to the digester through the line 33 so as to continuously contact fresh sludge entering the digester with sludge withdrawn from the digester. This again assures thorough inoculation of the fresh sludge with anaerobic bacteria. As stated above, the digester is preferably a closed tank and may be provided with a gas vent 37. The gases from the digester 34 may be vented to the atmosphere or utilized in any manner known to the prior art.

Digested sludge may be withdrawn from the digester 34 by a pump 38 through a line 39 and a portion of this sludge discharged from the process through a line 41. The digested sludge discharged from the process may be treated in any manner known to the prior art, the usual manner of treatment being to dry the sludge. The odor of the sludge is not objectionable as it has a tarry odor, and the dried sludge may be employed as fertilizer or in any other manner known to the prior art. A substantial portion of the digester sludge, for example, from 10 to 50%, may be returned through the line 11 for admixture with incoming fresh sewage or industrial waste. Approximately 25% of the sludge withdrawn from the digester 34 will usually be returned to the process, although the exact amount will vary with the nature of the wastes or sewage being treated. Since the sludge entering the digester has a relatively high solids content, it is unnecessary to provide a line for discharge of supernatant liquid from the digester as all of the liquid may be discharged with the digested sludge. Also, since the sludge entering the digester 34 has a much lower water content than is usual for material delivered to a digester, the digester may be of considerably smaller size than is usually required for treating a given amount of sewage or industrial wastes directly into anaerobic digesters.

The supernatant liquid or treated sewage may be withdrawn from the settling tank 28 through a line 42, a preferred manner of separating the treated sewage from the sludge in the settling tank being to discharge the treated sewage over a weir 43 near the top of the settling tank. In many cases, the treated sewage discharge from the line 42 may be immediately disposed of as treated sewage as it will ordinarily have a relatively low biological oxygen demand because of the substantially complete separation of suspended solids in the settling tank 28 along with adsorbed or precipitated organic materials which are normally soluble therein. If, however, the biological oxygen demand of the treated sewage is too high for discharge from the process, it can be subjected to further treatment by any of the conventional treatment processes known to the prior art, such as trickling filter, activated sludge, sand filtration, or lagooning, to reduce the biological oxygen demand to that required under the particular circumstances.

The following specific example is furnished for the purpose of illustration only and is not to be construed as placing any limitation upon the scope of the present invention:

*Example*

Fresh, unsettled meat packing waste having a 5 day B. O. D. of 1940 p. p. m. and total suspended solids of 1560 p. p. m. was introduced into an agitator and subjected to slow agitation for a period of one hour (paddle tip velocity 1 foot/second). The waste was then settled for a period of two hours without agitation. Analysis of this conventionally-treated waste after settling showed a 54% reduction in total suspended solids content and a 36% reduction in 5 day B. O. D. An identical run was made using the same fresh, unsettled meat packing waste and agitation at the same conditions with 10% by volume active anaerobic sludge added to the unsettled waste. Sufficient Ca(OH)₂ was also added to adjust the pH of this mixture to slightly above pH 7. After flocculating for one hour in the presence of the active anaerobic sludge, the waste was permitted to settle for a period of two hours without agitation. Analysis of this waste after settling showed a 75% reduction in total suspended solids content and a 48% reduction in 5 day B. O. D.

From the above description of the invention, it will be apparent that I have provided an improved process by which a relatively concentrated sludge may be obtained from raw sewage or raw industrial wastes by employing digester sludge as a flocculating and precipitating or insolubilizing agent for the raw waste or sewage. This enables a treated sewage substantially free of suspended solids and low in organic material content to be discharged from a settling operation prior to digestion, and also enables a concentrated sludge to be produced for delivery to a digester so that the digester for treating a given amount of sewage may be materially reduced in size. Since admixture of the incoming wastes with the digester sludge enables flocculation to be rapidly produced and rapid settling to be obtained, all of the elements of the apparatus may, in general, be of considerably smaller size than the apparatus usually required for treating a given amount of sewage or strong industrial wastes.

Obviously, many modifications and variations of the invention as hereinbefore set forth may be made without departing from the spirit and scope thereof, and therefore only such limitations should be imposed as are indicated in the appended claims.

I claim:

1. The process of treating raw wastes, which comprises: mixing a fresh, unsettled raw waste of high solids content with a substantial portion of active anaerobic sludge from a digester; adjusting the pH of the mixture thus formed to at least pH 7 and agitating to flocculate the suspended solids in said raw waste; thereafter settling the resulting mixture to produce a supernatant liquid substantially free of suspended solids and a settled sludge; separating said settled sludge from said supernatant liquid and delivering the separated sludge to a digester; subjecting said separated sludge to anaerobic digestion in said digester; discharging a portion of the active anaerobic digested sludge from the process; and returning a substantial portion of said active anaerobic digested sludge for admixture with said incoming raw waste.

2. The process of treating raw wastes, which comprises: mixing a fresh, unsettled raw industrial waste of high solids content with a substantial portion of active anaerobic sludge from a digester and sufficient lime to adjust the pH of the mixture to a value within the range of 7 to 9.5 to flocculate the suspended solids in said raw waste and precipitate soluble organic material in said raw waste; thereafter settling the resulting mixture to produce a supernatant liquid substantially free of suspended solids and low in soluble organic material content and a settled sludge; separating said settled sludge from said supernatant liquid and delivering the separated sludge to a digester before substantial anaerobic digestion occurs; subjecting said separated sludge to anaerobic digestion in said digester; discharging a portion of the active anaerobic digested sludge from the process; and returning a substantial portion of said active anaerobic digested sludge for admixture with said incoming raw waste, the amount of said active anaerobic sludge returned for admixture with the incoming raw waste being between approximately 10% and 50% of such sludge withdrawn from said digester.

3. The process of treating raw wastes, which comprises: mixing a fresh, unsettled raw industrial waste of high solids content with a substantial portion of active anaerobic sludge from a digester; slowly agitating the mixture of raw waste and active anaerobic sludge at a pH between approximately 7 and 9.5 for a period of time ranging between ½ and 6 hours to flocculate the suspended solids in said raw waste and precipitate soluble organic material in said raw waste; thereafter settling the resulting mixture to produce a supernatant liquid substantially free of suspended solids and low in soluble organic material content and a settled sludge; separating said settled sludge from said supernatant liquid and delivering the separated sludge to a digester; subjecting said separated sludge to anaerobic digestion in said digester for a period of time ranging between approximately 12 and 120 hours; discharging a portion of the active anaerobic digested sludge from the process; and returning a substantial portion of said active anaerobic digested sludge for admixture with said incoming raw waste.

4. The process of treating raw wastes, which comprises: mixing an industrial raw fresh, unsettled waste of high solids content with a substantial portion of active anaerobic sludge from a digester; slowly agitating the mixture of raw waste and active anaerobic sludge at a pH between approximately 7 and 9.5 for a period of time ranging between ½ and 6 hours to flocculate the suspended solids in said raw waste and precipitate soluble organic material in said raw waste; thereafter settling the resulting mixture to produce a supernatant liquid substantially free of suspended solids and low in soluble organic material content and a settled sludge; separating said settled sludge from said supernatant liquid and delivering the separated sludge to a digester; subjecting said separated sludge to anaerobic digestion in said digester for a period of time ranging between approximately 12 and 120 hours; discharging a portion of the active anaerobic digested sludge from the process and returning a substantial portion of said active anaerobic digested sludge for admixture with said incoming raw waste, the amount of said active anaerobic sludge returned for admixture with the incoming raw waste being between approximately 10% and 50% of such sludge withdrawn from said digester.

5. In an anaerobic decomposition process for the treatment of raw industrial waste of high solids content, the improvement which comprises: contacting the raw waste entering the process, prior to settling thereof, with a substantial portion of an active anaerobic sludge; agitating the mixture of raw waste and active anaerobic sludge at a pH of at least 7 to flocculate the suspended solids in the raw waste and precipitate soluble organic material in said waste; thereafter settling the resulting mixture to produce a supernatant, substantially solids-free liquid, low in soluble organic material content, and a settled sludge; separating said settled sludge from said supernatant liquid; and delivering said separated sludge to an anaerobic digester.

6. A process as in claim 5 wherein the pH of the mixture of active anaerobic sludge and raw, unsettled waste is maintained within the range from about pH 7 to about pH 9.5.

EVERETT N. MORTENSON.

References Cited in the file of this patent

UNITED STATES PATENTS

| Number | Name | Date |
|---|---|---|
| 1,820,976 | Imhoff | Sept. 1, 1931 |
| 1,963,581 | Heukelekian | June 19, 1934 |
| 1,997,252 | Fischer | Apr. 9, 1935 |
| 2,324,400 | Kelly et al. | July 13, 1943 |
| 2,442,241 | Koruzo et al. | May 25, 1948 |
| 2,444,671 | Prager | July 6, 1948 |
| 2,528,649 | Genter et al. | Nov. 7, 1950 |

OTHER REFERENCES

Babbitt, Sewerage and Sewage Treatment, 6th Ed. (1947), pages 390 and 513 cited, pub. by Wiley and Sons, Inc.

Metcalf and Eddy, American Sewerage Practice, vol. III, 3rd Ed. (1935), page 4 cited, pub. by McGraw-Hill Book Co., Inc.